United States Patent [19]

Hata

[11] Patent Number: 4,839,918
[45] Date of Patent: Jun. 13, 1989

[54] SWITCHING SYSTEM BETWEEN CORDLESS TELEPHONE AND ORDINARY TELEPHONE

[75] Inventor: Mamoru Hata, Tokyo, Japan

[73] Assignee: NEC Corporation, Tokyo, Japan

[21] Appl. No.: 97,023

[22] Filed: Sep. 16, 1987

[30] Foreign Application Priority Data

Sep. 17, 1986 [JP] Japan ............................ 61-216994

[51] Int. Cl.[4] .......................................... H01A 7/04
[52] U.S. Cl. .................................... 379/61; 379/63
[58] Field of Search ................ 379/61, 62, 63, 179

[56] References Cited

U.S. PATENT DOCUMENTS 4,640,987  2/1987  Tsukada et al. ............... 379/62
4,691,338  9/1987  Makino ........................ 379/61
4,706,274  11/1987 Baker et al. ................... 379/61
4,731,812  3/1988  Akerberg ..................... 379/61

Primary Examiner—Robert Lev
Attorney, Agent, or Firm—Sughrue, Mion, Zinn, Macpeak and Seas

[57] ABSTRACT

A system for enabling switching between a cordless telephone, including a fixed unit and a portable unit, and an ordinary telephone which may be connected to the cordless telephone through a subscriber network. The portable unit portion of the cordless telephone may be connected to an ordinary telephone, even when power is not available to the fixed unit, by providing selective switching to the subscriber network, which provides power to the telephone unit which is part of the fixed unit.

19 Claims, 2 Drawing Sheets

SWITCHING SYSTEM BETWEEN CORDLESS TELEPHONE AND ORDINARY TELEPHONE

BACKGROUND OF THE INVENTION

The present invention relates to a cordless or wireless telephone and, more particularly, to a switching system for use between the cordless telephone and an ordinary telephone.

A cordless telephone comprises a fixed unit which is connected to a telephone network through a subscriber line and a portable unit which is connected to the fixed unit. The fixed unit, is equipped with a telephone unit including a handset, and with a transmitter-receiver for radio communication with the portable unit over a radio channel. A subscriber of the portable unit can communicate through the fixed unit with a subscriber of an ordinary telephone connected to the telephone network.

Here, the telephone unit and the transmitter-receiver are supplied with power only from a common power source. If the common power supply is cut off by power failure or any other cause, the telephone unit of the fixed unit will become unusable and thus the communication using the telephone unit. the portable unit will be made impossible even though the telephone unit itself is operable.

SUMMARY OF THE INVENTION

An object of the present invention is to provide a switching system which permits its telephone unit to communicate with an ordinary telephone subscriber, even when the common power supply to the fixed unit is cut off.

Another object of the invention is to provide a switching system which permits mutual communication among an ordinary telephone set, the telephone unit of a fixed unit and a portable unit.

Still another object of the invention is to provide a switching system which permits be achieved with a command that is manually generated at the telephone unit or remotely generated from the portable unit.

According to the invention, there is provided a switching system for use between a cordless telephone and an ordinary telephone, comprising a fixed unit and a portable unit connected to each other by radio, a telephone unit provided on the fixed unit side, an internal line applied with a D.C. voltage which is applied to the fixed unit, a first switch responsive to a first switching control signal for selectively connecting the telephone unit to one of a subscriber line and the internal line, the subscriber line being connected to a telephone network, a second switch responsive to a second switching control signal for selectively connecting the fixed unit to one of the subscriber line and the internal line, and switching control means responsive to a switching command signal for generating the first and second switching control signals.

According to the invention, there also is provided a switching system for use between a cordless telephone and an ordinary telephone, comprising a fixed unit and a portable unit used in the cordless telephone and radio connected to each other, a power source for supplying electric power to the fixed unit, an internal connection line connected to the power source, a first switch responsive to a first switching signal for selectively connecting the telephone unit to one of a subscriber line connected to a telephone network and tee internal connection line, and a second switch responsive to a second switching signal for selectively connecting the fixed unit to one of the subscriber line and the internal connection line.

BRIEF DESCRIPTION OF THE DRAWINGS

The above and other objects, features and advantages of the present invention will become more apparent from the detailed description hereunder when taken in conjunction with the accompanying drawings, in which.

DESCRIPTION OF THE PREFERRED EMBODIMENT

Figure 1:
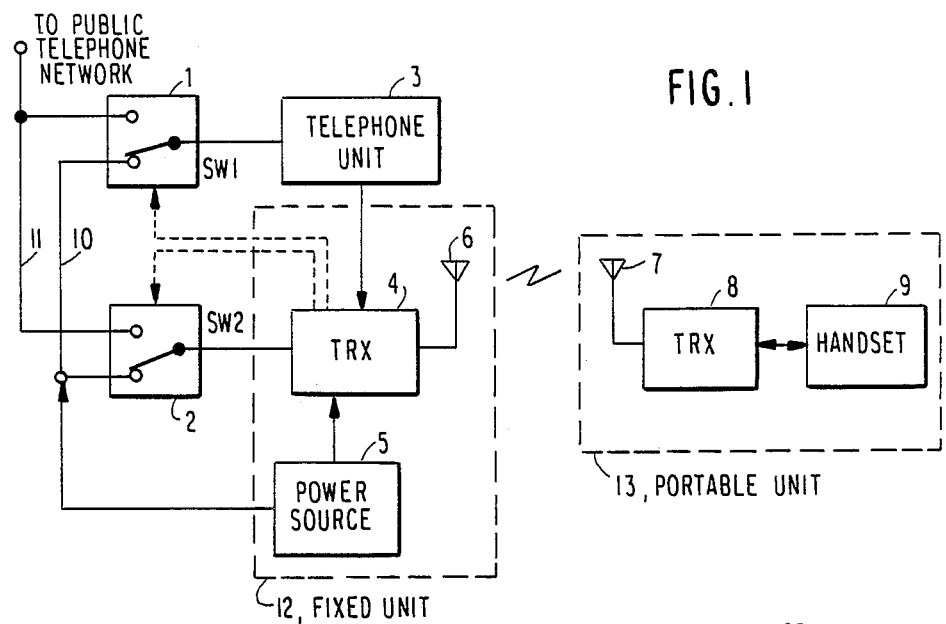
FIG. 1 is a block diagram illustrating a preferred embodiment of the invention.

Referring to a FIG. 1, a fixed unit 12 connected to public telephone network and a portable unit 13 constitute a cordless telephone. The portable unit 13 includes an antenna 7, a transmitter-receiver (including a control unit) 8 and a handset 9. The fixed unit 12, connected to another subscriber through the telephone network, comprises a transmitter-receiver (including a control unit) 4, a power source 5 and an antenna 6. The power source 5 also supplies power to a telephone unit 3 through an internal connection line 10 and a switch 1. The power source 5 may be supplied with commercial A.C. power and regulate it to produce D.C. power.

Switches 1 and 2 are intended to switch the connection of the telephone unit 3 and the fixed unit 12 to the internal connection line 10 or a subscriber line 11. The switches 1 and 2 are controlled by either manual switching at the telephone unit 3 or remote switching from the portable unit 13. By switching these switches 1 and 2, mutual communication is made possible among an ordinary subscriber telephone connected to the telephone network, the telephone unit 3 and the portable unit 13.

The operation of this preferred embodiment will now be described.

When both switches 1 and 2 are on the internal connection line 10 side (as shown in FIG. 1), radio communication is made possible between the portable unit 13 and the telephone unit 3 on the fixed unit 12 side. In this case, the telephone unit 3 operates on a D.C. voltage from the power source 5. When the switches 1 and 2 are on the internal connection line 10 side and the subscriber line 11 side, respectively, communication is made possible between the portable unit 13 and another subscriber through the fixed unit 12 and the telephone network. When the switches 1 and 2 are on the subscriber line 11 side and the internal connection line 10 side, respectively, communication is made possible between the telephone unit 3 on the fixed unit 12 side and another subscriber through the telephone network. In this case, a D.C. voltage is supplied from the subscriber line 11 to the telephone unit 3. Since the telephone unit 3 does not use the power source 5 of the fixed unit 12, it will continue to operate normally even if the power source 5 is cut off by A.C. power failure or the like.

When both switches 1 and 2 are on the subscriber line 11 side, three-party communication is made possible among the portable unit 13, the telephone unit 3 and another subscriber.

Now the system of FIG. 1 will be described in detail with reference to FIGS. 2 to 5.

Figure 2:
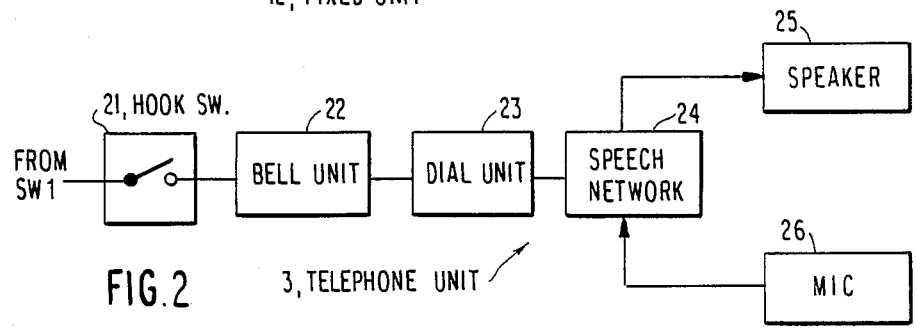
FIG. 2 is a block diagram illustrating the telephone unit shown in FIG. 1.

FIG. 2 is a block diagram of the telephone unit 3 shown in FIG. 1. The telephone unit 3 comprises a hook switch 21 for turning the unit on and off, a bell unit 22, a dial unit 23, a speaker 25 and a microphone 26, the last two being connected by way of a speech network 24. The speech network 24 branches an input line from the dial unit 23 into lines for the speaker 25 and for the microphone 26. The telephone set 3 has the same structure as an ordinary telephone; therefore, no detailed description of its operation will be provided.

Figure 3:
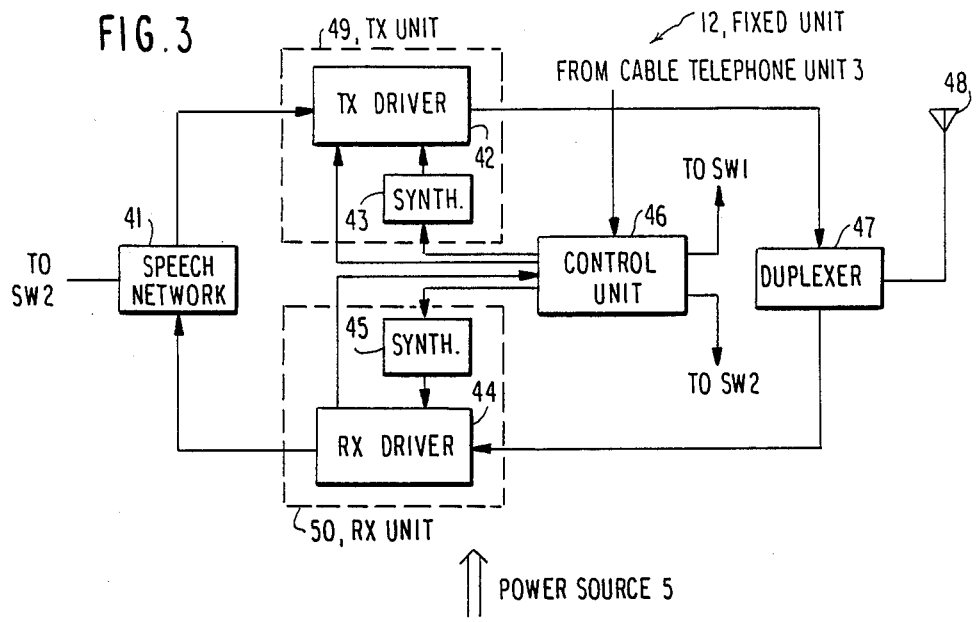
FIG. 3 is a block diagram of the fixed unit shown in FIG. 1.

FIG. 3 is a block diagram of the fixed unit 12 shown in FIG. 1. A radio signal from the portable unit 13 is picked up by an antenna 48 and supplied through a duplexer 47 to a receiver unit 50 and demodulated thereat. The demodulated output is supplied through a speech network 41 to the switch 2 (FIG. 1), a signal from which is supplied through the speech network 41 to a transmitter unit 49 and modulated thereat. The modulated output is transmitted via the duplexer 47 and the antenna 48 to the portable unit 13.

A control unit 46, in order to turn the transmit frequency and the receive frequency to a desired channel, provides a channel designation signal to a synthesizer 43 of the transmitter unit 49 and a synthesizer 45 of the receiver unit 50. The control unit 46 also provides various control signals for controlling the portable unit 13 to a transmit driver 42, and switching control signals to the switches 1 and 2. The portable unit control signal given to the transmitter unit 49 is demodulated on a carrier wave, and transmitted to the portable unit 13 through a duplexer 29 and an antenna 28. The control unit 46 receives, and supplies to the switches 1 and 2, the switching control signals which are transmitted from the portable unit 13 and demodulated by the receiver unit 50.

Figure 4:
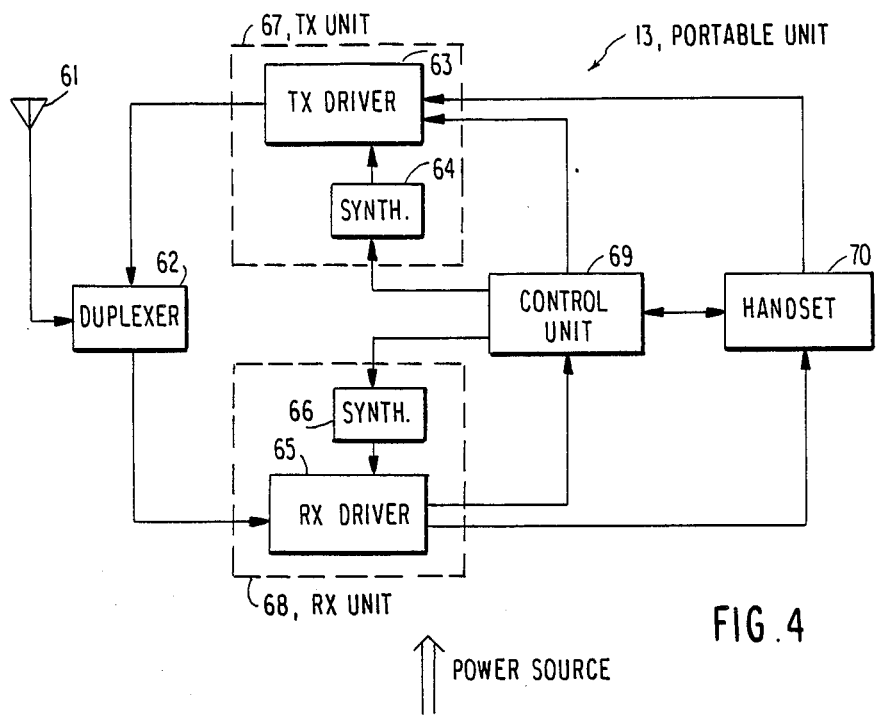
FIG. 4 is a block diagram of the portable unit shown in FIG. 1.

FIG. 4 is a block diagram of the portable unit 13 shown in FIG. 1. A radio signal from the fixed unit 12 is picked up by an antenna 61 and supplied through a duplexer 62 to a receiver unit 68 and demodulated thereat. The demodulated output includes a speech signal and various control signals from the fixed unit. The speech signal and the control signals are supplied to a handset 70 and a control unit 69, respectively. The handset 70 comprises a microphone, a speaker, a keyboard, a bell unit or the like. A speech signal which is inputted from the handset 70, is supplied to a transmitter unit 67. Switching control signals and other control signals which are also inputted from the handset 70, are supplied to the transmitter 67 through the control unit 69. The transmitter unit 67 modulates a carrier wave with these inputted signals and transmits the modulated wave to the fixed unit 12 by way of a duplexer 62 and an antenna 61. The control unit 69 controls the synthesizer 64 of the transmitter unit 67 and the synthesizer 66 of the receiver unit 68 to tune the portable unit 13 to a desired channel.

Figure 5:
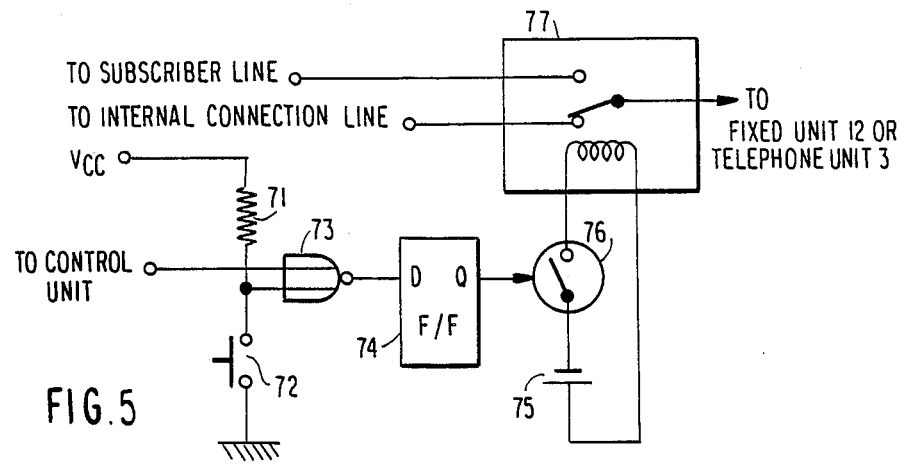
FIG. 5 is a block diagram of the switches shown in FIG. 1.

FIG. 5 is a block diagram of the switches 1 and 2 shown in FIG. 1. A switching command signal from the portable unit 13 and a switching command signal from a manual switch 72 are applied to a NOR circuit 73, whose output, if either one of the foregoing two switching control signals is applied, actuates a flip-flop circuit 74. Then, the Q output pulse of flip-flop circuit 74 turns on a switch 76, which actuates a relay 77 to connect the fixed unit 12 or telephone unit 3 to the subscriber line side or the internal connection line side.

This structure permits the switches 1 and 2 to be controlled by manual operation at the telephone unit 3 or by a switching control signal from the portable unit 13.

Once this relay 77, which is a self-holding type, is switched to the subscriber line side or the internal connection line side in response to the output pulse of the flip-flop 74, it holds its state until the flip-flop circuit 74 supplies the next pulse to the switch 76. A power source 75 may be either the power source of the fixed unit 12 used in common or separately provided.

As hitherto described, the present invention makes possible mutual communication between an ordinary subscriber, a telephone unit and a portable unit. It also enables a switching command, i.e. a command on connection between an ordinary subscriber, the telephone unit and the portable unit, to be manually generated at the telephone unit or remotely generated from the portable unit. Furthermore, even in the event of power source failure in the fixed unit, the telephone unit can continue to communicate with another subscriber.

What is claimed is:

1. A switching system for selectively connecting a cordless telephone and telephone unit, comprising:
   a fixed unit, on a first side, and a portable unit, on a second side, connected to each other by radio;
   a telephone unit provided on said first side;
   an internal line applied with a D.C. voltage from a power source which is applied to said fixed unit;
   a first switch responsive to a first switching control signal for selectively connecting said telephone unit to one of a subscriber line and said internal line, said subscriber line being connected to a telephone network;
   a second switch responsive to a second switching control signal for selectively connecting said fixed unit to one of said subscriber line and said internal line; and
   switching control means responsive to a switching command signal for generating said first and second switching control signals, said telephone unit receiving power from one of said internal line and said subscriber line in accordance with said first and second switching control signals such that said telephone unit continues to operate even during failure of said power source.

2. A switching system as claimed in claim 1, further comprising first means for manually generating said switching command signal.

3. A switching system as claimed in claim 2, wherein said portable unit comprises second means, different from said first means, for generating said switching command signal.

4. A switching system for selectively connecting a cordless telephone and a telephone unit, comprising:
   a fixed unit and a portable unit provided in said cordless telephone and radio-connected to each other;
   a power source for supplying electric power to said fixed unit;
   an internal connection line connected to said power source;
   a first switch responsive to a first switching signal for selectively connecting said telephone unit to one of a subscriber line connected to a telephone network and said internal connection line; and a second switch responsive to a second switching signal for selectively connecting said fixed unit to one of said subscriber line and said internal connection line.

5. A switching system as claimed in claim 4, further comprising means for manually generating said first and second switching signals.

6. A switching system as claimed in claim 4, wherein said portable unit comprises means for generating said first and second switching signals.

7. A switching system as claimed in claim 4, wherein both of said first and second switches operate in response to said first and second switching signals, respectively, and wherein said first and second switching signals are either manually generated or remotely generated signals are either manually generated or remotely generated from said portable unit.

8. A switching system as claimed in claim 7, wherein each of said first and second switches comprises a self-holding type relay.

9. A switching system as claimed in claim 4, wherein said first and second switches are selectively controllable so as to connect both said telephone unit and said fixed unit to said subscriber line.

10. A switching system as claimed in claim 4, wherein said first and second switches are selectively controllable so as to connect both said telephone unit and said fixed unit to said internal connection line.

11. A switching system as claimed in claim 4, wherein said first and second switches are selectively controllable so as to connect only said telephone unit to said subscriber line.

12. A switching system as claimed in claim 4, wherein said first and second switches are selectively controllable so as to connect only said fixed unit to said subscriber line.

13. A switching method of switching between a telephone unit and a cordless telephone, said cordless telephone including a fixed unit and a portable unit radio-connected to each other, said method comprising the steps of:

supplying electric power source to said fixed unit;

connecting said telephone unit through a first switch to one of a subscriber line connected to a telephone network and a connection line connected to said power source;

connecting said fixed unit through a second switch to one of said subscriber line and said connection line; and operating said first and second switches such that said telephone unit receives power from one of said connection line and said subscriber line, said telephone unit continuing to operate even during failure of said power source.

14. A method as claimed in claim 13, further comprising the step of manually generating control signals for switching said first and second switches.

15. A method as claimed in claim 13, further comprising the step of generating control signals for switching said first and second switches from said portable unit.

16. A method as claimed in claim 13, further comprising the step of supplying first and second control signals to said first and second switches to connect both said telephone unit and fixed unit to said subscriber line.

17. A method as claimed in claim 13, further comprising the step of supplying first and second control signals to said first and second switches to connect both said telephone unit and fixed unit to said connection line.

18. A method as claimed in claim 13, further comprising the step of supplying first and second control signals to said first and second switches to connect only said telephone unit to said subscriber line.

19. A method as claimed in claim 13, further comprising the step of supplying first and second control signals to said first and second switches to connect only said fixed unit to said subscriber line.

* * * * *

UNITED STATES PATENT AND TRADEMARK OFFICE
CERTIFICATE OF CORRECTION

PATENT NO. : 4,839,918

DATED : June 13, 1989

INVENTOR(S) : HATA

It is certified that error appears in the above-identified patent and that said Letters Patent is hereby corrected as shown below:

Column 1, line 25, after "unit" delete "the portable unit";

Column 1, lines 40, 41 and 42, delete "be achieved with a command that is manually generated at the telephone unit or remotely generated from the portable unit" and insert --connection among the ordinary telephone set, the telephone unit of the fixed unit, and the portable unit to be achieved with a command that is manually generated at the telephone unit or remotely generated from the portable unit--;

Column 1, line 68, delete "tee" and insert --the--;

Column 6, line 22, after "signals" insert --from said portable unit--;

Column 6, line 23, after "switches" delete "from said portable unit".

Signed and Sealed this

Twelfth Day of November, 1991

Attest:

HARRY F. MANBECK, JR.

*Attesting Officer*    *Commissioner of Patents and Trademarks*